(12) United States Patent
Guo

(10) Patent No.: US 7,615,978 B2
(45) Date of Patent: Nov. 10, 2009

(54) CURRENT MODE CONTROL WITH FEED-FORWARD FOR POWER DEVICES

(75) Inventor: Yigang Guo, Cupertino, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 309 days.

(21) Appl. No.: 11/187,430

(22) Filed: Jul. 22, 2005

(65) Prior Publication Data
US 2007/0018624 A1    Jan. 25, 2007

(51) Int. Cl.
*G05F 1/00* (2006.01)
(52) U.S. Cl. ........................... 323/282; 323/288
(58) Field of Classification Search ................ 323/284, 323/285, 266, 288, 282
See application file for complete search history.

(56) References Cited

U.S. PATENT DOCUMENTS

| | | | | |
|---|---|---|---|---|
| 4,438,466 A | * | 3/1984 | Fawkes et al. | 360/66 |
| 4,672,518 A | * | 6/1987 | Murdock | 363/21.04 |
| 6,057,675 A | * | 5/2000 | Tateishi | 323/283 |
| 6,414,469 B1 | * | 7/2002 | Zhou et al. | 323/272 |
| 6,492,794 B2 | * | 12/2002 | Hwang | 323/285 |
| 6,873,140 B2 | * | 3/2005 | Saggini et al. | 323/283 |
| 2001/0050547 A1 | * | 12/2001 | Takimoto et al. | 323/284 |
| 2002/0067168 A1 | * | 6/2002 | Sessions | 324/601 |

OTHER PUBLICATIONS

R. Mammano, "Switching Power Supply Technology," 1994, Penton Publishing, Inc., 3 pages.

* cited by examiner

*Primary Examiner*—Adolf Berhane
*Assistant Examiner*—Nguyen Tran
(74) *Attorney, Agent, or Firm*—Sidley Austin LLP

(57) ABSTRACT

A power device controller includes a voltage mode control loop to generate an error voltage and to control a power device and a current mode control loop to generate a current control voltage and to control the power device. The current mode control loop includes a current feed-forward to reduce a load dependence of a loop gain by reducing a load current dependence of a low frequency component of a gain of the error voltage to the output voltage with a current loop closed. A multi-phase power device controller for controlling several power devices includes a shared voltage mode control loop to generate an error voltage and a shared current mode control loop to generate a current control voltage, the shared current mode control loop including a current feed-forward to reduce a load current dependence of a low frequency component of a loop gain.

19 Claims, 12 Drawing Sheets

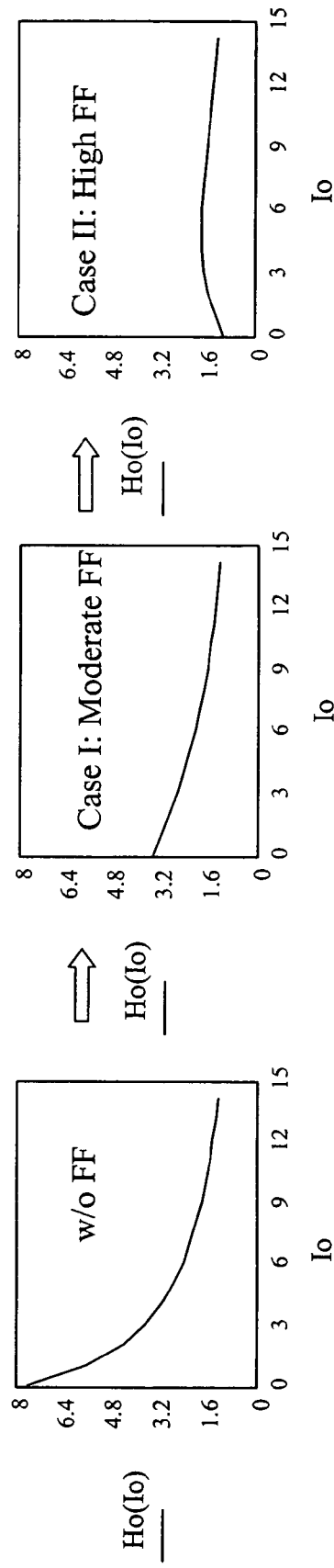

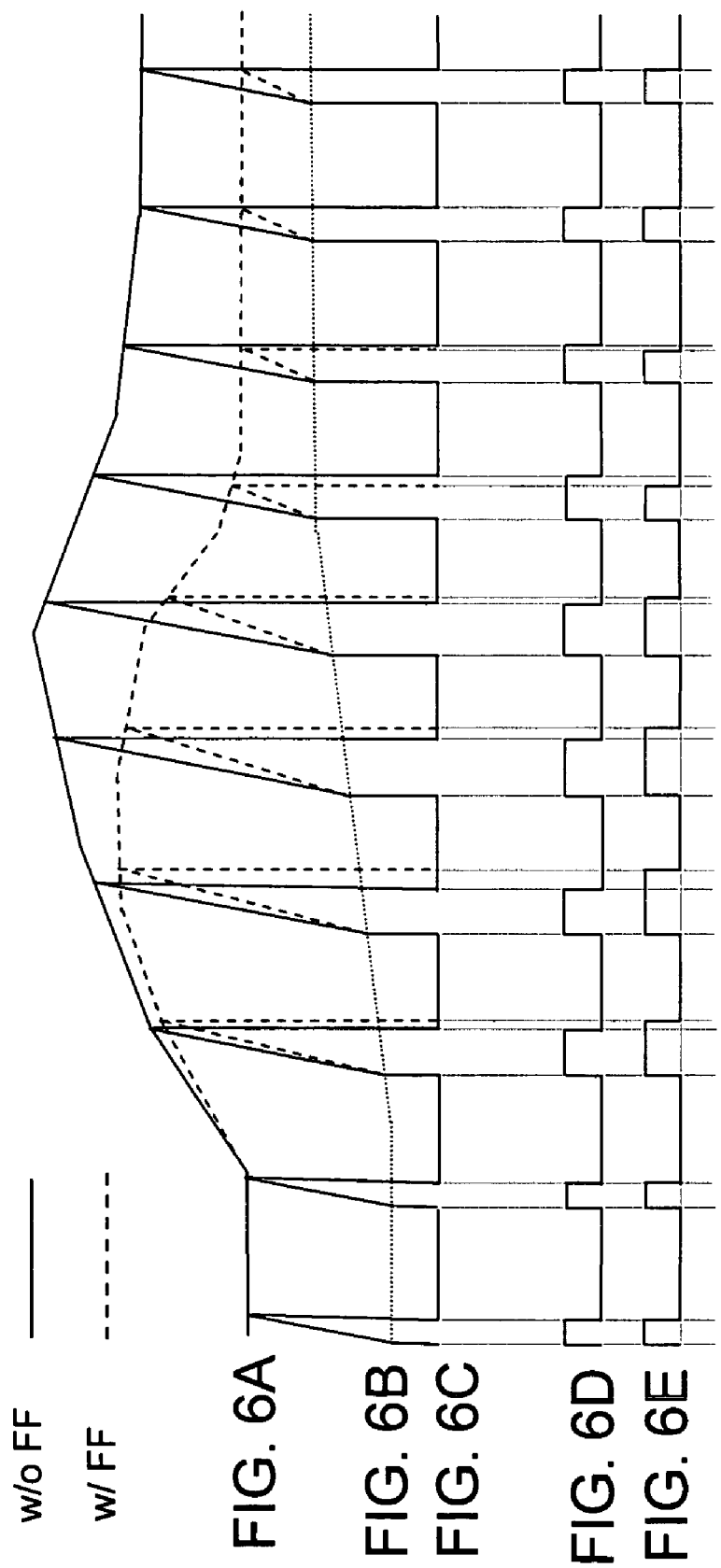

CURRENT MODE CONTROL WITH FEED-FORWARD FOR POWER DEVICES

BACKGROUND

1. Field of Invention

The present invention relates to power device controllers and more particularly to two loop power device controllers with current mode control.

2. Description of Related Art

Advanced electronic circuitry requires advanced power sources. The newer generations of power sources utilize power devices with corresponding control circuits, which are capable to drive the power devices with great precision and fast transient response. These control circuits are capable of reducing, or even eliminating traditional problems, such as the dependence of the output voltage on the operating temperature or load, the uneven dependence of the control mechanisms on the frequency, and so on.

Many power device controllers utilize one loop feedback. Typically this feedback loop operates in voltage mode control, sensing an output voltage, comparing it to a reference voltage, and using the generated error voltage to modify the operation of the power device, such as its duty cycle.

Other designs use two loop control circuits. In addition to the voltage mode control loop, these designs utilize a current mode control loop. This second loop senses the output current and uses this information to control the power device faster.

However, even in such advanced two-loop designs the control characteristics exhibit load dependences. Therefore, there is room for improvement in power device control circuits.

SUMMARY

Briefly and generally, embodiments of the invention include a power device controller for controlling a power device generating an output voltage at an output terminal, the power device controller comprising a voltage mode control loop, configured to generate an error voltage and to control the power device, and a current mode control loop, configured to generate a current control voltage and to control the power device, the current mode control loop comprising a current feed-forward, configured to reduce a load dependence of a loop gain by reducing a load current dependence of a low frequency component of a gain of the error voltage to the output voltage with a current loop closed.

Other embodiments include a multi-phase power device controller for controlling a set of power devices, the power devices generating output voltages at output terminals, the power device controller comprising a shared voltage mode control loop, configured to generate an error voltage and to control the power devices, and a shared current mode control loop, configured to generate a current control voltage and to control the power devices, the shared current mode control loop comprising a current feed-forward, configured to reduce a load current dependence of a low frequency component of a gain of the error voltage to the output voltages.

Embodiments include a power device controller for controlling a power device generating an output voltage at an output terminal in connection to an inductor, the power device controller comprising a voltage mode control loop, coupled to the power device, a current mode control loop, coupled to the voltage mode control loop and the power device, and a current mode feed-forward, coupled to the current mode control loop, a ramp generator, and a sensed inductor current, configured to modify a slope of at least one a ramp voltage of the ramp generator and a sensed inductor current of an inductor, according to a load current.

Embodiments also include a power device controller for controlling a power device generating an output voltage at an output terminal, the power device controller comprising a current mode control loop, coupled to the power device, an adjustable ramp generator, a current sensor, configured to sense an output current, a current mode feed-forward, coupled to the current mode control loop, the adjustable ramp generator, and the current sensor, configured to modify a slope of at least one a ramp voltage of the ramp generator and a sensed current of the current sensor dependent on a load current.

BRIEF DESCRIPTION OF DRAWINGS

For a more complete understanding of the present invention and for further features and advantages, reference is now made to the following description taken in conjunction with the accompanying drawings.

FIG. 4 illustrates the load current dependence of the error voltage to the output voltage transfer function according to an embodiment of the invention.

FIG. 6 illustrates various signal shapes with and without feed-forward blocks, according to embodiments of the invention.

DETAILED DESCRIPTION

Embodiments of the present invention and their advantages are best understood by referring to FIGS. 1-9 of the drawings. Like numerals are used for like and corresponding parts of the various drawings.

Figure 1:
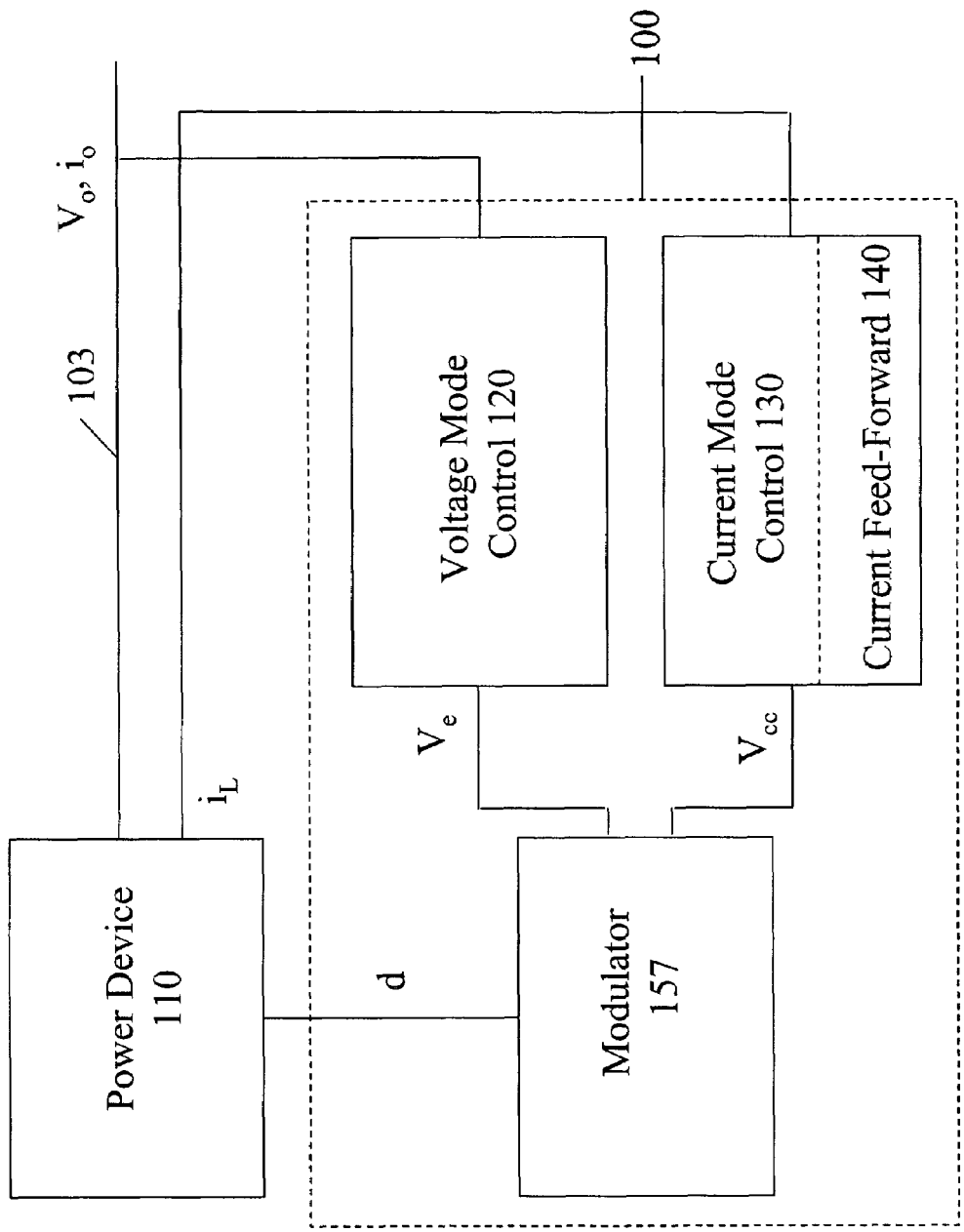
FIG. 1 illustrates a block diagram of a power device controller, according to an embodiment of the invention.

FIG. 1 illustrates a block diagram of a power device controller 100. A function of power device controller 100 is to control a power device 110. Power device 100 generates an output voltage $V_o$ at an output terminal 103. The corresponding current will be referred to as output current $i_O$, or load current. Power device controller 100 includes a voltage mode control loop 120, which generates an error voltage $V_e$ (or error-out voltage) and controls power device 110 in single loop voltage mode control configuration. Error voltage $V_e$ can arise from any number of perturbations, such as a small amplitude noise in any part of the system, including variation of output voltage $V_o$. Power device controller 100 can also include a current mode control loop 130 in a two loop current mode control configuration, which generates a current control voltage $V_{cc}$ to control power device 110. Current mode control loop 130 includes a current feed-forward 140, configured to reduce the dependence of a DC gain $H_o$ of error voltage $V_e$ to the output voltage Vo with a current loop closed: $H_o=V_o/V_e$, on the load current $i_o$. As illustrated in relation to FIGS. 5A-D, DC gain $H_o$ can have a broad spectrum. Embodiments of the present invention reduce the $i_o$ dependence of $H_o$ in a low frequency range, such as in the DC regime.

Typical ranges for $i_o$ include 0 A-100 A, for $V_o$ the range of 0.5V-30V. Other applications may use different current and voltage values.

FIG. 1 illustrates that power device controller 100 includes a modulator 157, coupled to voltage mode control loop 120 to receive error voltage $V_e$ at a voltage control terminal and to current mode control loop 130 to receive current control voltage $V_{cc}$ at a current control terminal. Modulator 157 outputs a power device control signal d, representing a command-duty cycle, corresponding to the received error voltage $V_e$ and the received current control voltage $V_{cc}$. Here, duty cycle d represents the fraction of time within a switching cycle, when a top switch is turned on in power device 110, as described below. Modulator 157 controls power device 110 through power device control signal d.

Figure 2:
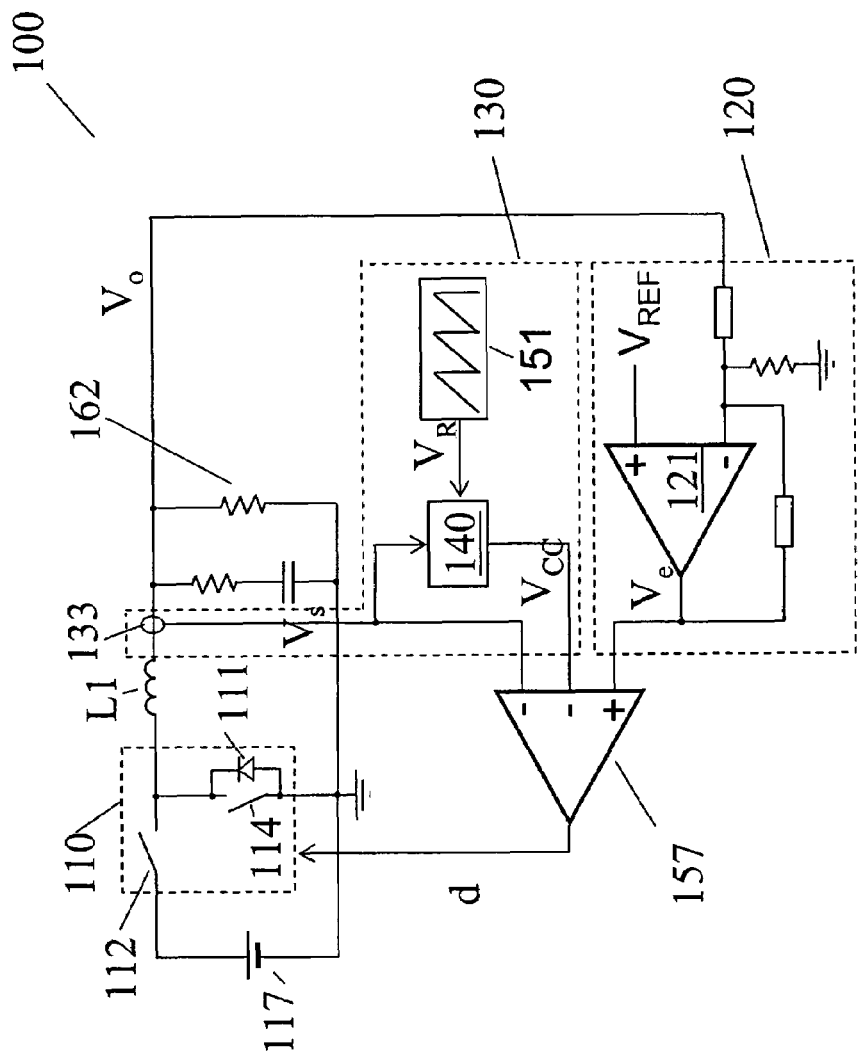
FIG. 2 illustrates an implementation of a power device controller, according to an embodiment of the invention.

FIG. 2 illustrates that in some embodiments voltage mode control loop 120 includes a voltage error amplifier 121, which receives a reference voltage $V_{Ref}$ from a reference voltage source and output voltage $V_o$ from output voltage terminal 103. Voltage error amplifier 121 outputs error voltage $V_e$ corresponding to a difference of the reference voltage $V_{Ref}$ and the output voltage $V_o$.

Current mode control loop 130 includes a current sensor 133, configured to sense inductor current $i_L$, for example, at output terminal 103 and to generate a corresponding sensor voltage $V_s$. Current sensor can be a small series resistor in the output path. Current sensor can also utilize inductor a direct current resistance (DCR) of inductor L1, an on-resistance of top switch 112 or bottom switch 114, a current transformer, etc. In some embodiments sensor voltage $V_s$ is used directly as a feedback signal for modulator 157.

However, in peak current mode control, when duty cycles of power device 110 exceed about 50%, the power system may exhibit an unstable behavior, e.g. sub-harmonic oscillations. Further, power devices 110 may include an output inductor L1 at output terminal 103. Typically a large value is chosen for inductance L of output inductor L1 to increase the system efficiency, if there are no critical transient response requirements. However, in light or no load situations this large L value causes inductor current $i_L$ and thus sensor voltage $V_s$ to assume small ramp, resulting in high noise sensitivity.

Some designs overcome both of the mentioned problems by including a ramp generator 151. Ramp generator 151 generates a ramp voltage $V_R$, which can be combined with sensor voltage $V_S$. The combined voltage has an enhanced slope, thus increasing the stability of current mode control loop 130. Also, the above mentioned instability at larger duty cycles is dampened by combining ramp voltage $V_R$ with sensor voltage $V_S$.

In embodiments of the present invention current mode control loop 130 generates current control voltage $V_{CC}$ by modifying at least one of the slope of sensor voltage $V_S$ and ramp voltage $V_R$. This is a rather general design principle, which can be realized in several different ways.

In some embodiments this principle is carried out by coupling current feed-forward 140 to current sensor 133 and to ramp generator 151. In such designs, current feed-forward 140 generates current control voltage $V_{CC}$ by modifying a slope of ramp voltage $V_R$ in relation to sensor voltage $V_S$. The slope can be a rising slope or a falling slope, or the slope of some segment of ramp voltage $V_R$. In other embodiments, the slope is captured by a peak-to-valley difference of ramp voltage $V_R$. This modification reduces the load current dependence of the DC gain of error voltage $V_e$ to the output voltage $V_o$ with current loop closed. In formula, using the notation $H_o=V_o/V_e$, this means to reduce the $i_o$ dependence of $H_o$. The low frequency component can be a DC gain or a low frequency segment of the spectrum of $H_o$.

In some embodiments, both sensor voltage $V_S$ and current control voltage $V_{CC}$ are coupled into inverted terminals of modulator 157, whereas error voltage $V_e$ is coupled into the non-inverted terminal of modulator 157. In other embodiments, sensor voltage $V_S$ and current control voltage $V_{CC}$ are coupled into a signal processor, whose output is then coupled into modulator 157.

Modulator 157 controls power device 110 through the duty cycle of power device 110. Embodiments of power device 110 include designs in which power device 110 includes a power diode 111, a top switch 112, and a bottom switch 114, powered by an input voltage source 117. Power diode 111 can also be the parasitic diode of bottom switch 114. Power switches 112 and 114 turn on and off alternatively: when top switch 112 turns on, bottom switch 114 turns off and vice versa. Modulator 157 controls duty cycled by controlling the fraction of time within each switching cycle when top switch 112 is turned on and bottom switch 114 is turned off.

As indicated in FIG. 2, output terminal 103 is connectable to a load 162. Load 162 can be a resistor, parallel coupled to output capacitors, forming an effective RC circuit.

Figure 3:
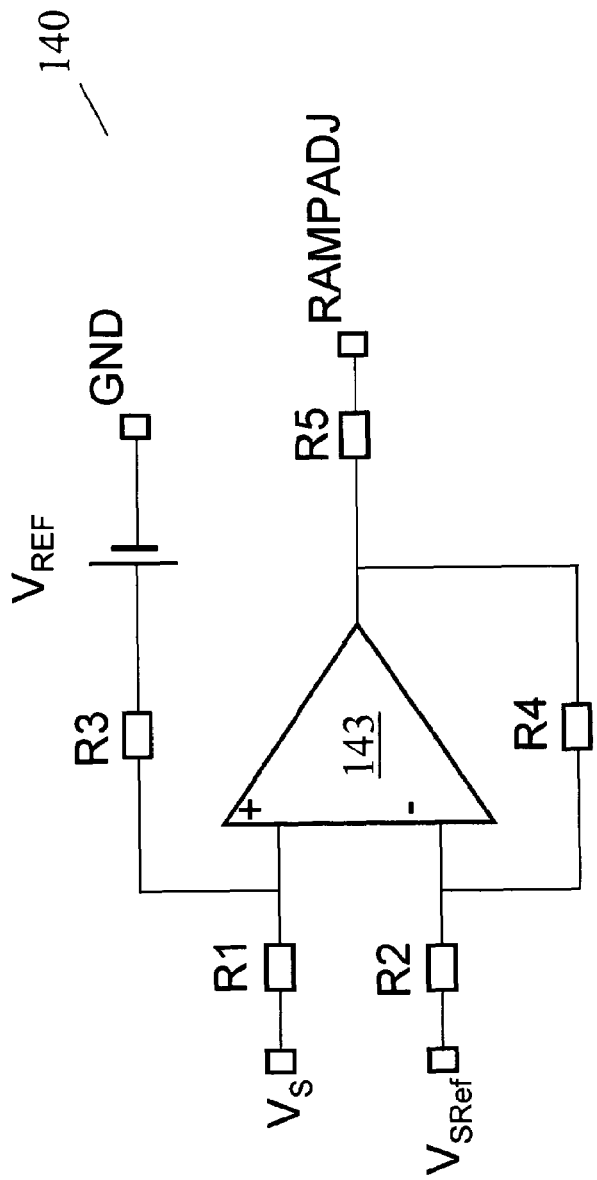
FIG. 3 illustrates a current feed-forward block according to an embodiment of the invention.

FIG. 3 illustrates an embodiment of current feed-forward 140, based on Fairchild product FAN5182. This embodiment includes a differential amplifier 143, coupled to current sensor 133 through resistor R1 to receive sensor voltage $V_S$. The inverted terminal of differential amplifier 143 is coupled to a reference voltage, $V_{SRef}$ through resistor R2. A reference voltage $V_{Ref}$ is also coupled to the non-inverted terminal through resistor R3, to set the operating point of differential amplifier 143. Finally, the inverted terminal is coupled to the output terminal of differential amplifier 143 through resistor R4. In some embodiments R1=R2 and R3=R4. In others, the values of R1, . . . R4 can be different. The ratio R3/R1 determines the signal gain of differential amplifier 143. The output of differential amplifier 143 is coupled into a signal processor or modulator 157 through resistor R5 to modify a slope of ramp voltage $V_R$ through terminal RAMPADJ. Many other embodiments of current feed-forward 140 can be designed with comparable functionalities.

FIGS. 4A-C illustrate various small signal characteristics of power device controller 100. In general, the dependence of DC gain $H_o$ of error voltage $V_e$ to output voltage $V_o$, with current loop closed, on load current $i_o$ (or equivalently, inductor current $i_L$) can be captured by the equation:

$$Ho = \frac{Ro}{Ri} \times \frac{1}{1 + \frac{Ro}{L*f_s} \times (Mc \times (1-d) - 0.5)} \quad (1)$$

In Eq. (1) $R_o$ is a resistance of load 162, $R_i$ is a resistance of current sensor 133, L is the inductance of inductor L1, $f_s$ is a switching frequency of power device controller 100, external ramp parameter $M_c$ represents an external ramp parameter and d is a duty cycle of power device controller 100. In cases, when output voltage $V_o$ is essentially fixed, the output current $i_O$ dependence of $H_o$ is generated by Ro depending on $i_O$ in an inverse manner:

$$R_o = V_o/i_O \quad (2)$$

The analysis of Eq. (1) will be helpful in understanding the $i_O$ dependence of DC gain $H_o$.

FIG. 4A illustrates DC gain $H_o$ in designs, which do not employ current feed-forward 140. This translates to external ramp parameter Mc being essentially constant. Visibly, $H_o$ decreases with increasing $i_O$. In some embodiments, when $i_O$ sweeps the region between 0 A and 15 A, $H_o$ decreases to about 15% of its $i_O$=0 value.

If in Eq. (1) numerator and denominator are divided through with Ro, then the first term in the denominator is proportional to $i_O$ and the second term, containing external ramp parameter Mc is nearly independent of $i_O$. This explains that at large $i_O$, Ho decays approximately inversely with $i_O$, whereas at small $i_O$ values it goes to a finite value.

FIGS. 4B and 4C illustrate embodiments, where current feed-forward 140 modifies a slope of ramp voltage $V_R$. A general design principle of embodiments is that current feed-forward 140 reduces the load current dependence of the low frequency component of $H_o$ by making external ramp parameter Mc load current dependent. In some embodiments this is achieved by making Mc decrease with increasing $i_O$ in the second term of the denominator in Eq. (1). With this modification the Mc term is capable of counterbalancing the increase of the first term with $i_O$.

In some embodiments modulator transfer function Mc is modified through a factor Ki as follows:

$$Ki = \frac{k_{ff}}{i_L \times Ri + V_{os}}, \quad (3)$$

where Ki is a multiplicative factor in modulator transfer function Mc, $k_{ff}$ is a factor controlling the strength of current feed-forward 140 and $V_{os}$ is an offset voltage. Visibly, in this embodiment Mc acquired a dependence on inductor current $i_L$: Mc varies inversely with $i_L$.

FIG. 4B illustrates an embodiment with a moderate value of $k_{ff}$. In this embodiment the dependence of $H_o$ on $i_O$ has been reduced considerably: $H_o$ decays only to about 40% of its $i_O$=0 value over the 0 A to 15 A $i_O$ range.

FIG. 4C illustrates an embodiment with a large value of $k_{ff}$. In this embodiment the dependence of $H_o$ on $i_O$ has been reduced to a very weak dependence: the change of $H_o$ is minimal over the 0 A and 15 A $i_O$ range. Instead, $H_o$ exhibits a gentle maximum at intermediate $i_O$ values. In some embodiments, a target of the feed-forward architecture is to design Ho to be constant over the whole load range through various implementations.

In the embodiment of FIG. 3, based on Fairchild product FAN5182, Mc decreases with output current $i_O$ following a different form:

$$Mc = 1 + Se/Sn \quad (4)$$

where:

$$Se(Io) := \left[ \frac{Vin - 0.8}{332 \cdot 10^3 + 2 \cdot 10^3} - \frac{0.8 - 0.0005(90 - Io) \cdot 18}{49.9 \cdot 10^3} \right]. \quad (5)$$

$$\frac{0.2}{5 \cdot 10^{-12}} - Sn$$

Here Vin is an input voltage 117, Se is a slope of ramp voltage $V_R$, and Sn is the sensed rising slope of inductor current $i_L$. The numerical values of the parameters in the above Eqs. (3), (4), and (5) are for illustrative purposes only. Some embodiments have parameters considerably in excess or below the shown values.

FIGS. 5A-D illustrate the frequency dependence of a loop gain in Continuous Conduction Mode (CCM) for three different output current values: i=0 A, 7.5 A and 15 A. In embodiments, the plotted loop gain is proportional to DC gain Ho.

Figure 5A:
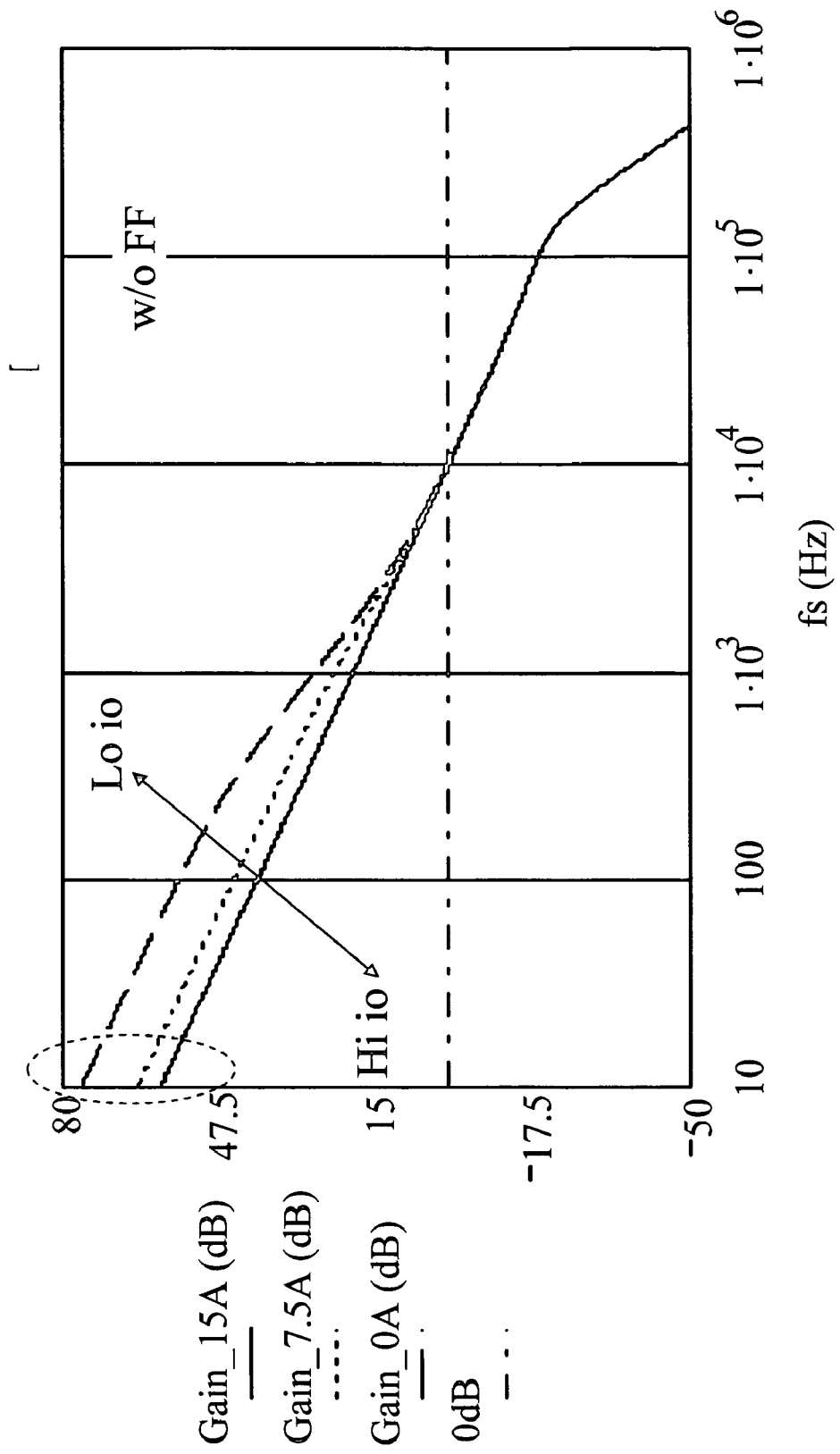
FIG. 5 illustrates the frequency dependence of loop gain with and without feed-forward blocks, according to embodiments of the invention.

FIG. 5A illustrates the loop gain in decibels in designs without current feed-forward 140 and thus with essentially output current independent external ramp parameter Mc. The loop gain can be defined as the signal gain after the signal has been traced in a closed loop around power device 110 and control loops 120 and 130, back to the point of departure. This point of departure can be e.g. the output of voltage error amplifier 121 in FIG. 2. The loop gain is shown for output current values of 0 A, 7.5 A and 15 A, and exhibits considerable dependence on $i_O$ in the low frequency regime. In some embodiments, the loop gain may vary by about 16 decibels with varying output current $i_O$ for frequencies below a few thousand Hz.

Figure 5B:
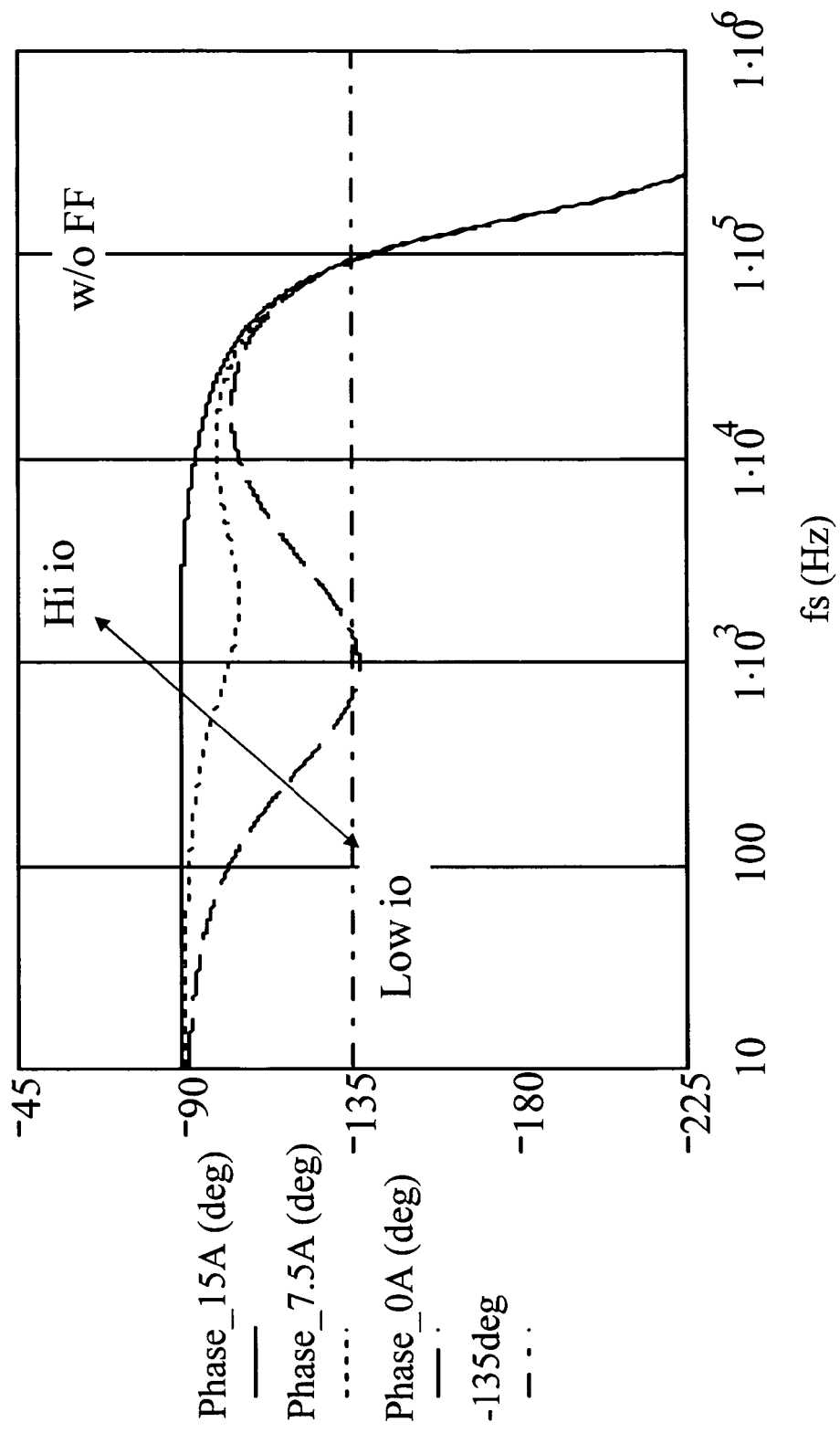

FIG. 5B illustrates the phase shift after the signal has been traced in a closed loop around power device 110 and control loops 120 and 130 in the design of FIG. 5A. The phase shift also exhibits considerable $i_O$ dependence in a low frequency regime centered around 1,000 Hz.

Figure 5C:
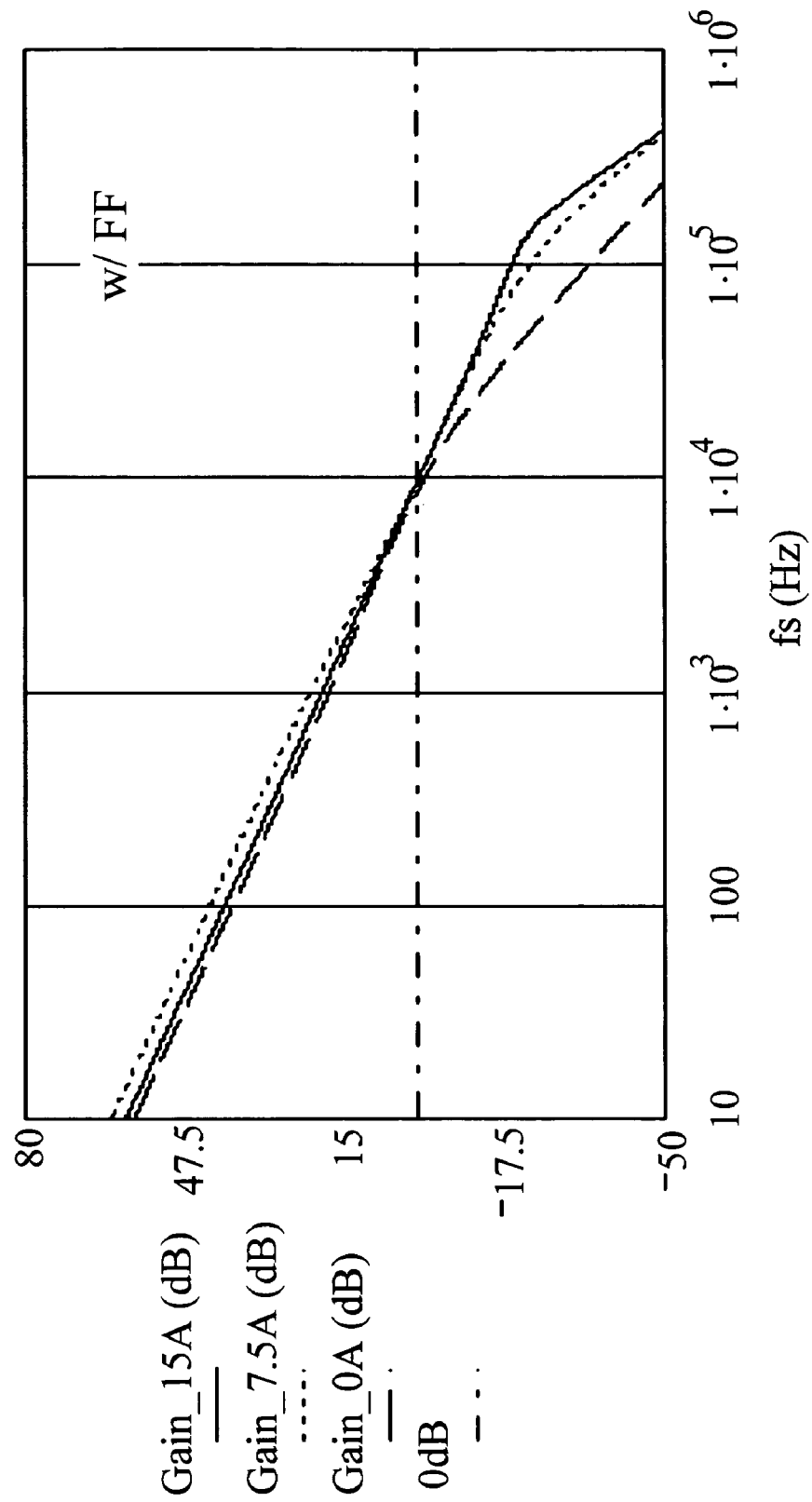

FIG. 5C illustrates the loop gain in an embodiment, which does have current feed-forward 140 and thus an output current dependent external ramp parameter Mc. Employing current feed-forward 140 has essentially eliminated the $i_O$ dependence in the low frequency region, such as at frequencies below about 10,000 Hz. In some embodiments a loop gain may exhibit dependence on $i_O$ at higher frequencies. However, at these frequencies the value of the loop gain is characterized by negative decibels, so the $i_O$ dependence of the loop gain is unimportant.

Figure 5D:
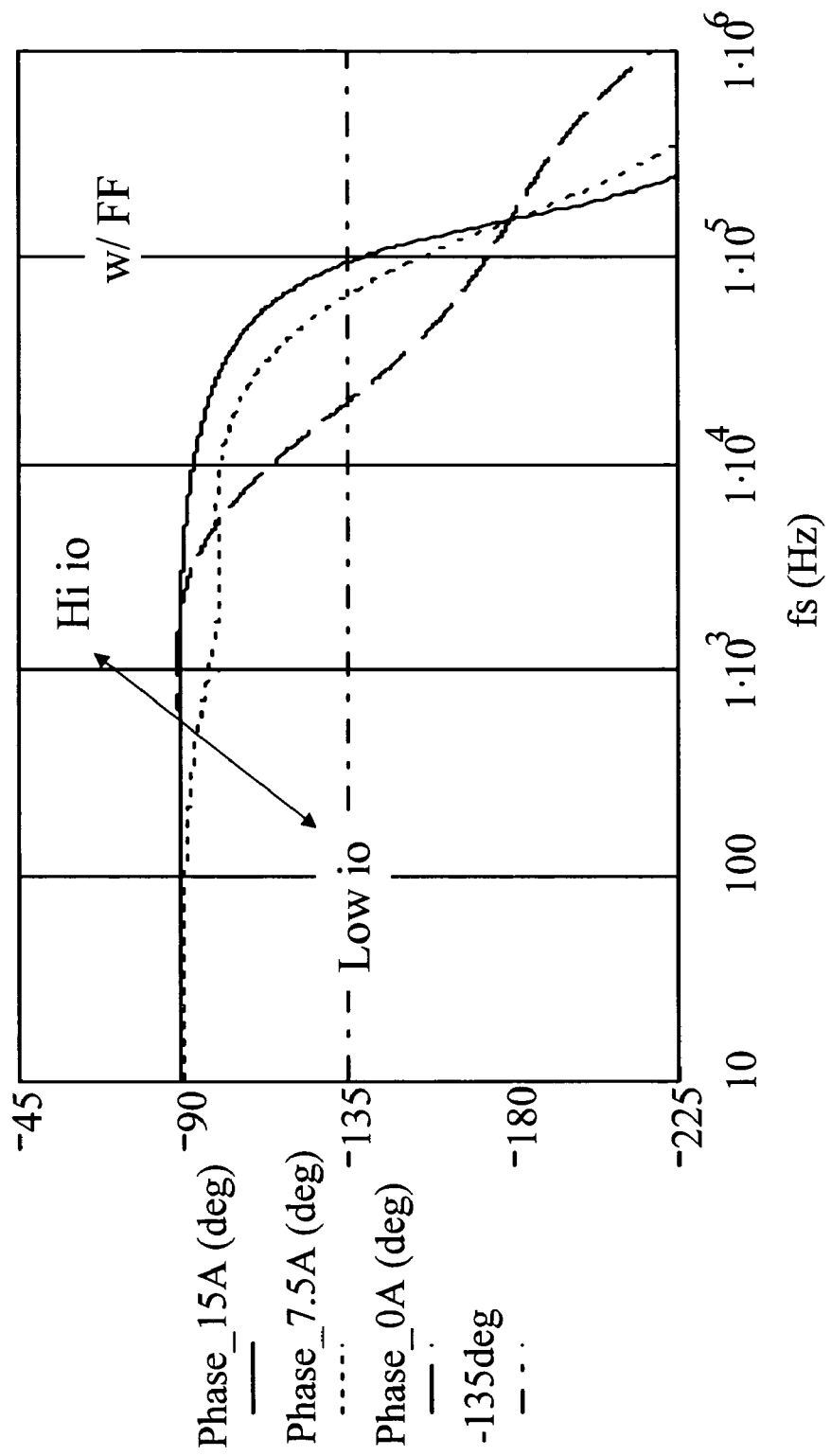

FIG. 5D illustrates the phase shift in the embodiment of FIG. 5C. The $i_O$ dependence has been essentially eliminated in a low frequency region, such as at frequencies below about 1,000 Hz. Some embodiments may exhibit a phase dependence of io at higher frequencies. However, typically the value of the loop gain is characterized by negative decibels, so this $i_O$ dependence is not critical.

FIGS. 6A-D illustrate the large signal behavior of some embodiments.

FIG. 6A shows the time domain transient response of error voltage $V_e$ during a load current step-up change shown in FIG. 6B. Output voltage $V_o$ decreases due to the step-up change of $i_o$ initially. In response, voltage error amplifier 121 in voltage mode control loop 120 generates an increased error voltage $V_e$.

FIG. 6C illustrates two loop designs, which include current mode control loop 130. In two-loop designs sensor voltage $V_S$, related to load current $i_o$ or inductor current $i_L$ as: $V_S=i_L \times R_i$ is added to (or otherwise combined with) ramp voltage $V_R$. The combined voltage is referred to as current control voltage $V_{CC}$ (solid line in FIG. 6C):

$$V_{CC}=V_R+i_L \times R_i \quad (6)$$

In these two loop designs there are two control channels. If during a transient period output voltage $V_o$ drops, that translates to an increased error voltage $V_e$. Increased error voltage $V_e$ drives current mode control loop 130 and 140 to increase duty cycle d as described above, thus suppressing the fluctuation.

FIG. 6D illustrates that one of the consequences of duty cycle d being bigger is that load current $i_o$ increases. Current sensor voltage $V_S = i_L \times R_i$ is additive to ramp voltage $V_R$. A larger $V_e$ translates to an enhanced current control voltage $V_{CC}$. Since the slope of current control voltage Vcc is the same, this enhancement of $V_{CC}$ increases duty cycle d and thus delivers more energy to the Vo to maintain Vo in the specified regulation range.

However, in such two-loop designs error voltage $V_e$ does not return to its pre-fluctuation value, as seen from the $9^{th}$ switching cycle onwards. Further, the settling time takes several switching cycles, such as 7 cycles in FIG. 6C.

FIGS. 6C and 6E illustrate that embodiments of the present invention address these issues by modifying the slope of ramp voltage $V_R$ in relation to load current $i_L$, which was independent of load current $i_L$ in the above two-loop design.

A mode of operation of embodiments of the present invention is illustrated by the dashed line in FIG. 6C. Sensor voltage $V_S = i_L \times R_i$ is again added to ramp voltage $V_R$ to form current control voltage $V_{CC}$. In addition, current feed-forward 140 also changes slope Se of ramp voltage $V_R$: Se is decreased with increasing $i_L$. Therefore, current control voltage $V_{CC}$ reaches $V_e$ slower. This causes power device 110 to be turned on longer, increasing duty cycle d and output voltage Vo. This additional control/feed-forward channel returns $V_e$ to its pre-fluctuation value, in contrast to the design without current feed-forward 140. Further, error voltage Ve returns to its pre-fluctuation value faster (in 5 switching cycles in FIG. 6C), compared to designs without feed-forward (7 switching cycles).

This feed-forward scheme has very high control bandwidth and it is able to make slope Se of ramp voltage $V_R$ load current dependent. This provides a corresponding and correcting duty cycle modulation without extensive action by feedback loops. The result is an essentially constant loop gain and nearly instantaneous response to changes in load current $i_o$. Finally, a function of current mode feed-forward is to achieve an essentially constant error voltage $V_e$ over the load to alleviate slew rate constraints of voltage error amplifier 121.

Figure 7:
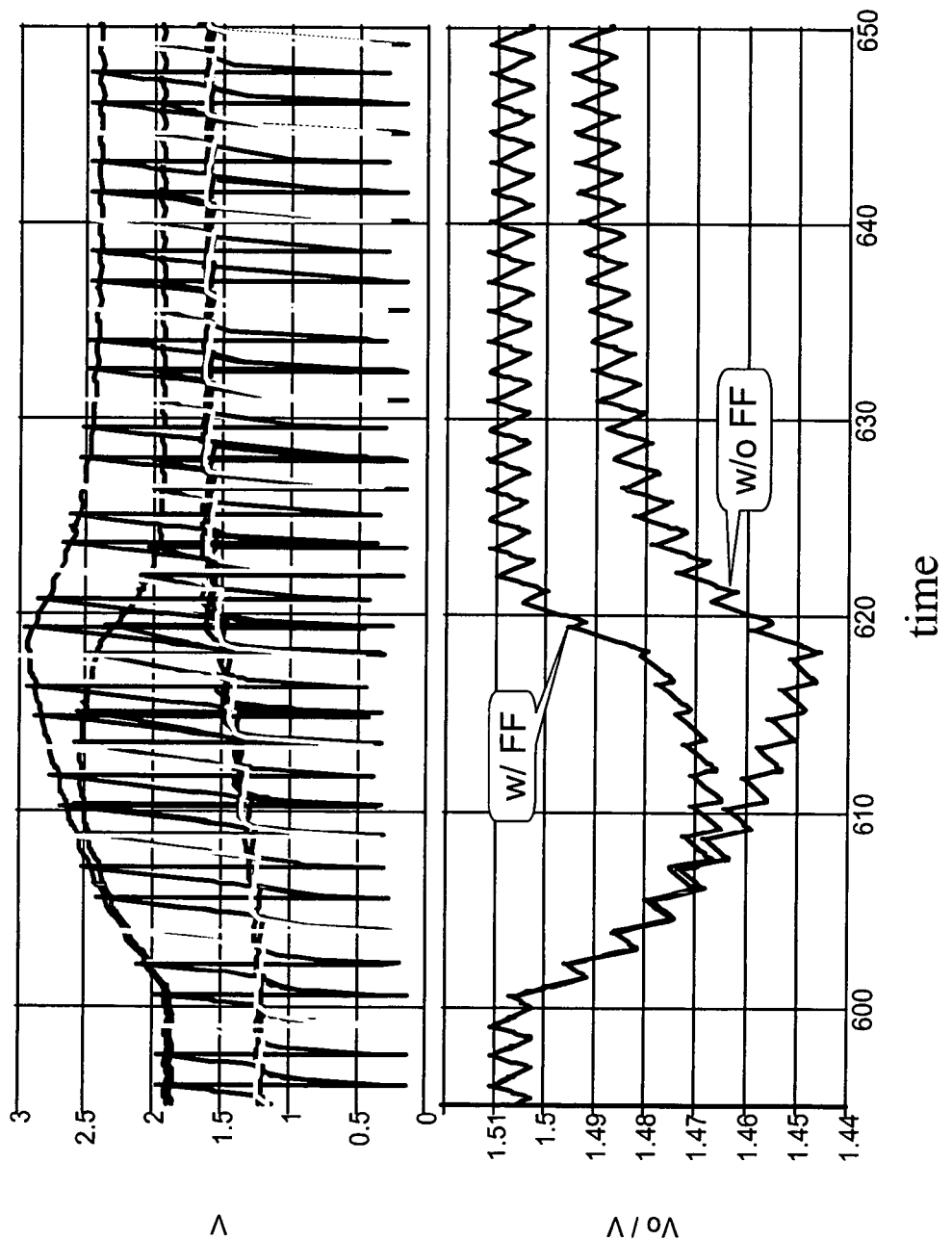
FIG. 7 illustrates various signal shapes with and without feed-forward blocks, according to embodiments of the invention.

FIG. 7 illustrates the same response features in simulation, this time in relation to output voltage $V_o$. FIG. 7 illustrates a comparison of fluctuation responses with and without current feed-forward 140. In embodiments with current feed-forward 140 output voltage Vo returns to its pre-fluctuation value, and the return is faster than in designs without current feed-forward 140.

Figure 8:
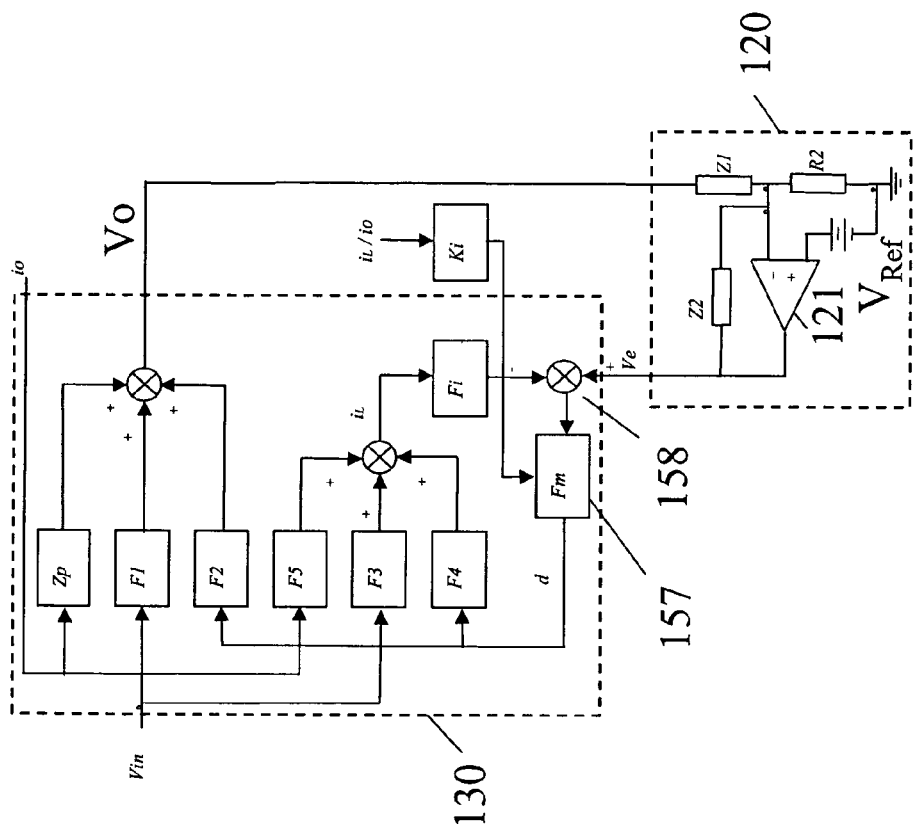
FIG. 8 illustrates embodiments of the invention in terms of small-signal transfer functions.

FIG. 8 illustrates embodiments of the invention in terms of a small-signal model. Voltage mode control loop 120 receives output voltage Vo and feeds it into voltage error amplifier 121. Voltage error amplifier 121 compares output voltage Vo to a reference voltage $V_{Ref}$ and outputs error voltage Ve. Impedances Z1, Z2 and resistor R2 adjust the gain and phase of voltage error amplifier 121 and output voltage set point by a voltage division. Error voltage Ve is fed toward modulator 157, which is represented here by Fm.

Modulator 157 receives another input from current sense Fi block. Inductor current $i_L$ is coupled into current sensing and sampling gain $F_i$, representing the transfer function from the sensed inductor current $i_L$ into sensor voltage $V_S$. The generated sensor voltage $V_S$ is coupled into a signal processor 158, which combines Ve and Vs e.g. by adding them and then couples the combined signal into modulator 157. In other embodiments, sensor voltage $V_S$ and error voltage $V_e$ are individually coupled into modulator 157.

Current feed-forward 140 is represented by feed-forward transfer function $K_i$. $K_i$ can be for example the transfer function given above by Eq. (3). Feed-forward transfer function $K_i$ can assume many different forms depending on the particular embodiment. A typical feature of $K_i$ is that it decreases the external ramp $V_R$ or $V_S$ with increasing inductor current $i_L$.

Modulator 157 transfers the inputted combination of error voltage Ve and sensor voltage $V_S$ and the feed-forward signal into duty cycle d. This transfer is captured by modulator transfer function Fm. In the notation of Eq. (1), modulator transfer function Fm corresponds to external ramp parameter $M_C$. Fm can be inversely related to the peak-to-valley value of ramp voltage $V_R+V_S$.

The present embodiment also includes ramp voltage $V_R$ of ramp generator 151, implicit in the above modulator transfer function Fm.

In some embodiments feed-forward transfer function $K_i$ modifies moderator transfer function Fm in a multiplicative manner. $K_i$ decreasing with increasing load current $i_o$ makes the modulator transfer function Fm also decrease with increasing load current $i_o$. This feature reduces the load current dependence of the DC gain of error voltage $V_e$ to output voltage $V_o$.

Duty cycle signal d is coupled into filter F2, representing the open loop duty cycle-to-output voltage Vo transfer function. Filter F2 represents power device 110 and the other elements of the output circuitry, including inductor L1, output capacitors, and load 162. The output of filter F2 is output voltage Vo, completing the signal tracing cycle.

The additional filters represent the following transfer paths:

Filter F1 represents the open loop input voltage $V_{in}$-to-output voltage $V_o$ transfer function;

Filter F3 represents the open loop input voltage $V_{in}$-to-inductor current $i_L$ transfer function;

Filter F4 represents the open loop duty cycle d-to-inductor current $i_L$ transfer function;

Filter F5 represents the open loop output current $i_O$-to-inductor current $i_L$ transfer function; and Filter Zp represents the open loop output impedance in relation to output voltage $V_o$ and output current $i_O$.

Figure 9:
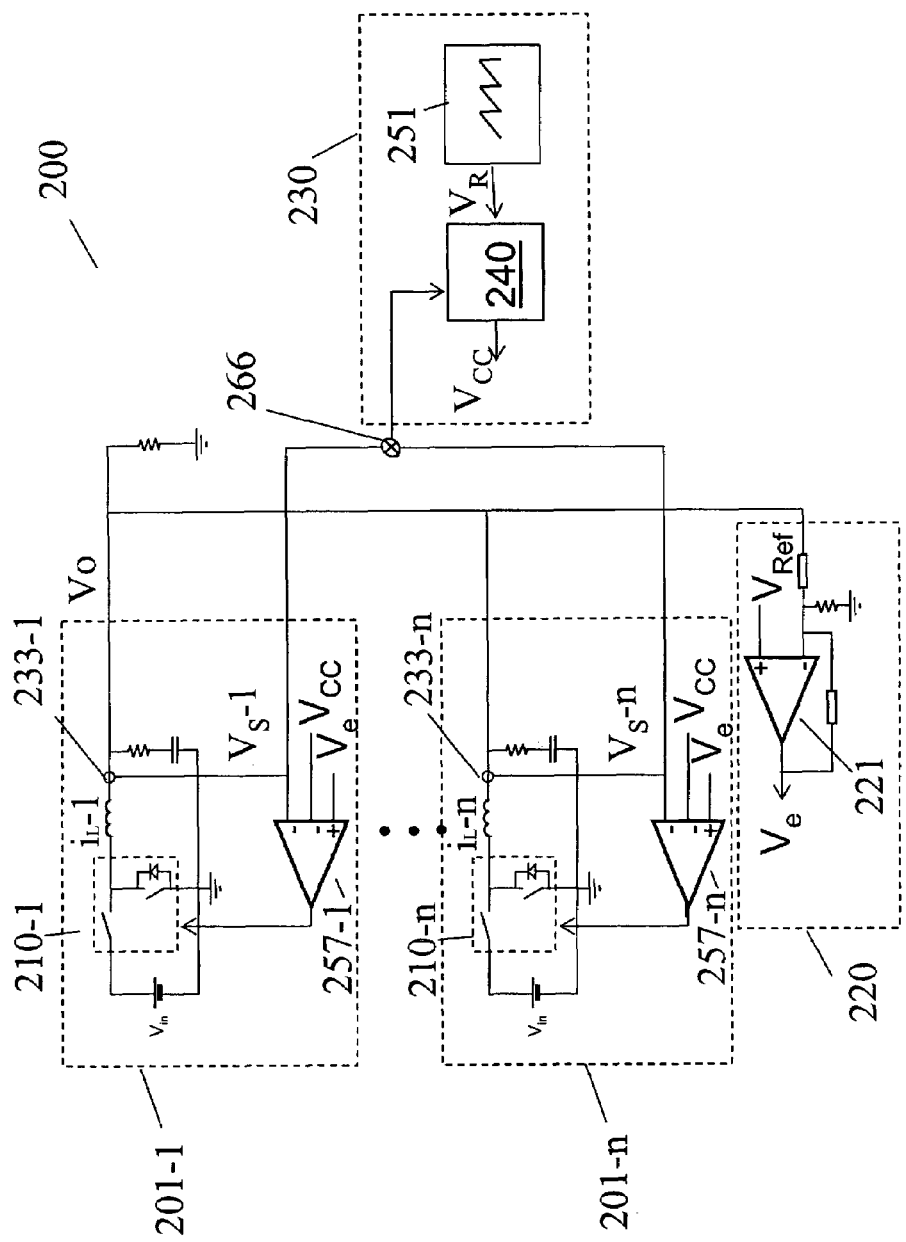
FIG. 9 illustrates a multiphase embodiment of the invention.

FIG. 9 illustrates a multi-phase power device controller 200 for controlling a set of power devices 210-1, ... 210-n. Multi-phase power device controller 200 includes n individual modules 201-1, ... 201-n, and several shared modules. These include shared voltage mode control loop 220, shared current control loop 230, shared current feed-forward 240 and shared ramp generator 251. Power devices 210 generate output voltage Vo at an output terminal. Output voltages Vo are coupled into shared voltage mode control loop 220, which generates an error voltage Ve to control power devices 210. Error voltage Ve is then coupled into modulators 257-1, ... 257-n of individual modules 201.

Multi-phase power device controller 200 also includes shared current mode control loop 230 to generate a current control voltage $V_{CC}$ to control power devices 210. Shared current mode control loop 230 includes shared current feed-forward 240, configured to reduce the load current dependence of a low frequency component of the gain of the error voltage Ve to output voltages Vo.

Modulators 257 are coupled to the shared voltage mode control loop 220 to receive error voltage Ve, and to shared current mode control loop 230 to receive current control voltage $V_{CC}$.

Shared voltage mode control loop 220 includes a shared voltage error amplifier 221, configured to receive a reference voltage $V_{Ref}$ from a reference voltage source, and output voltages Vo from the output voltage terminal. Shared voltage error amplifier 221 is configured to output error voltage Ve corresponding to a difference of the reference voltage and output voltages Vo.

Shared current mode control loop 230 includes shared ramp generator 251, configured to generate a ramp voltage, and a set of current sensors 233-1, . . . 233-n. Current sensors 233 are configured to sense the load currents at various locations, and to generate corresponding sensor voltages $V_S$-1, . . . $V_S$-n.

Shared current feed-forward 240 is coupled to current sensors 233 and to shared ramp generator 251. Shared current feed-forward 240 is configured to generate current control voltage $V_{CC}$ by modifying ramp voltage $V_R$ in relation to sensor voltage $V_S$.

Shared current mode control loop 230 is configured to generate a load dependent ramp for power devices 210 individually.

Summing/averaging node 266 sums or averages all individual sensor voltages Vs-1, . . . Vs-n and uses this information to program $V_R$ to be load current dependent.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power device controller for controlling a power device generating an output voltage at an output terminal, the power device controller comprising:
   a voltage mode control loop configured to generate an error voltage and to control the power device; and
   a current mode control loop configured to generate a current control voltage and to control the power device, the current mode control loop comprising:
      a ramp generator configured to generate a ramp voltage;
      a current sensor configured to sense a load current and to generate a corresponding sensor voltage; and
      a current feed-forward configured to generate the current control voltage by modifying a slope of the ramp voltage in relation to the sensor voltage in order to reduce a load dependence of a loop gain by reducing a load current dependence of a low frequency component of a gain of the error voltage to the output voltage with a current loop closed.

2. The power device controller of claim 1, the voltage mode control loop comprising:
   a voltage error amplifier configured to receives a reference voltage from a reference voltage source and the output voltage from the output voltage terminal, the voltage error amplifier configured to output the error voltage corresponding to a difference of the reference voltage and the output voltage.

3. The power device controller of claim 2, comprising:
   a modulator coupled to the voltage mode control loop to receive the error voltage at a voltage control terminal and to the current mode control loop to receive the current control voltage at a current control terminal, the modulator configured to output a power device control signal corresponding to the received error voltage and the received current control voltage.

4. The power device controller of claim 1, wherein the current feed-forward is coupled to the current sensor and to the ramp generator.

5. The power device controller of claim 1, the current feed-forward comprising:
   a differential amplifier, coupled to the current sensor, configured to output an amplified sensor current to the ramp generator.

6. The power device controller of claim 3, wherein the modulator is coupled to the current feed-forward to receive the current control voltage and to the current sensor to receive the sensor voltage.

7. The power device controller of claim 3, wherein the modulator is configured to control the power device by controlling a duty cycle of the power device through the power device control voltage.

8. The power device controller of claim 3, wherein the current feed-forward reduces the load current dependence of the low frequency component of the error voltage to output voltage gain with the current loop closed by modifying a transfer function of the modulator to decrease with increasing load current.

9. The power device controller of claim 1, wherein the current mode control loop is configured to return the error voltage to essentially its pre-fluctuation value after an output voltage fluctuation during a load transient response.

10. The power device controller of claim 9, wherein the current mode control loop is configured to return the error voltage to essentially its pre-fluctuation value after an output voltage fluctuation faster than the voltage mode control loop alone.

11. The power device controller of claim 1, wherein the current mode control loop is configured to reduce or eliminate a dynamic range of the error voltage of a voltage error amplifier.

12. A multi-phase power device controller for controlling a set of power devices, the power devices generating output voltages at an output terminal, the power device controller comprising:
   a shared voltage mode control loop configured to generate an error voltage and to control the power devices; and
   a shared current mode control loop configured to generate a current control voltage and to control the power devices, the shared current mode control loop comprising:
      a ramp generator configured to generate a ramp voltage;
      a set of current sensors configured to sense load currents of the power devices and to generate corresponding sensor voltages; and
      a current feed-forward configured to generate the current control voltage by modifying a slope of the ramp voltage in relation to the sensor voltages in order to reduce a load current dependence of a low frequency component of a loop gain or a gain of the error voltage to the output voltage with a current loop closed.

13. The multi-phase power device controller of claim 12, comprising:
   a set of modulators coupled to the shared voltage mode control loop to receive the error voltage and to the shared current mode control loop to receive the current control voltages.

14. The multi-phase power device controller of claim 12, the shared voltage mode control loop comprising:
   a shared voltage error amplifier configured to receive: a reference voltage from a reference voltage source and an output voltage from the output voltage terminal, the shared voltage error amplifier configured to output the error voltage corresponding to a difference of the reference voltage and the output voltage.

15. The multi-phase power device controller of claim 12, the shared current mode control loop comprising:
a summing-averaging node configured to sum or average the sensor voltages.

16. The multi-phase power device controller of claim 15, wherein
the shared current feed-forward is coupled to the current sensors and to the ramp generator.

17. The multi-phase power device controller of claim 12, wherein the shared current mode control loop is configured to generate a load current dependent ramp for the output voltages individually.

18. A power device controller for controlling a power device generating an output voltage at an output terminal in connection to an inductor, the power device controller comprising:
a voltage mode control loop, coupled to the power device and configured to generate an error voltage;
a current mode control loop, coupled to the voltage mode control loop and the power device; and
a current mode feed-forward coupled to the current mode control loop, to a ramp generator, and to current sensor, the current mode feed-forward configured to modify a slope of a ramp voltage of the ramp generator in relation to a sensed current in order to reduce a load dependence of a loop gain by reducing a load current dependence of a low frequency component of a gain of the error voltage to the output voltage with a current loop closed.

19. A power device controller for controlling a power device generating an output voltage at an output terminal, the power device controller comprising:
a voltage mode control loop, coupled to the power device and configured to generate an error voltage;
an adjustable ramp generator;
a current sensor, configured to sense an output current;
a current mode feed-forward coupled to the current mode control loop, the adjustable ramp generator, and the current sensor, the current mode feed-forward configured to modify a slope of a ramp voltage of the ramp generator in relation to a sensed current of the current sensor in order to reduce a load dependence of a loop gain by reducing a load current dependence of a low frequency component of a gain of the error voltage to the output voltage with a current loop closed.

* * * * *